Patented May 21, 1946

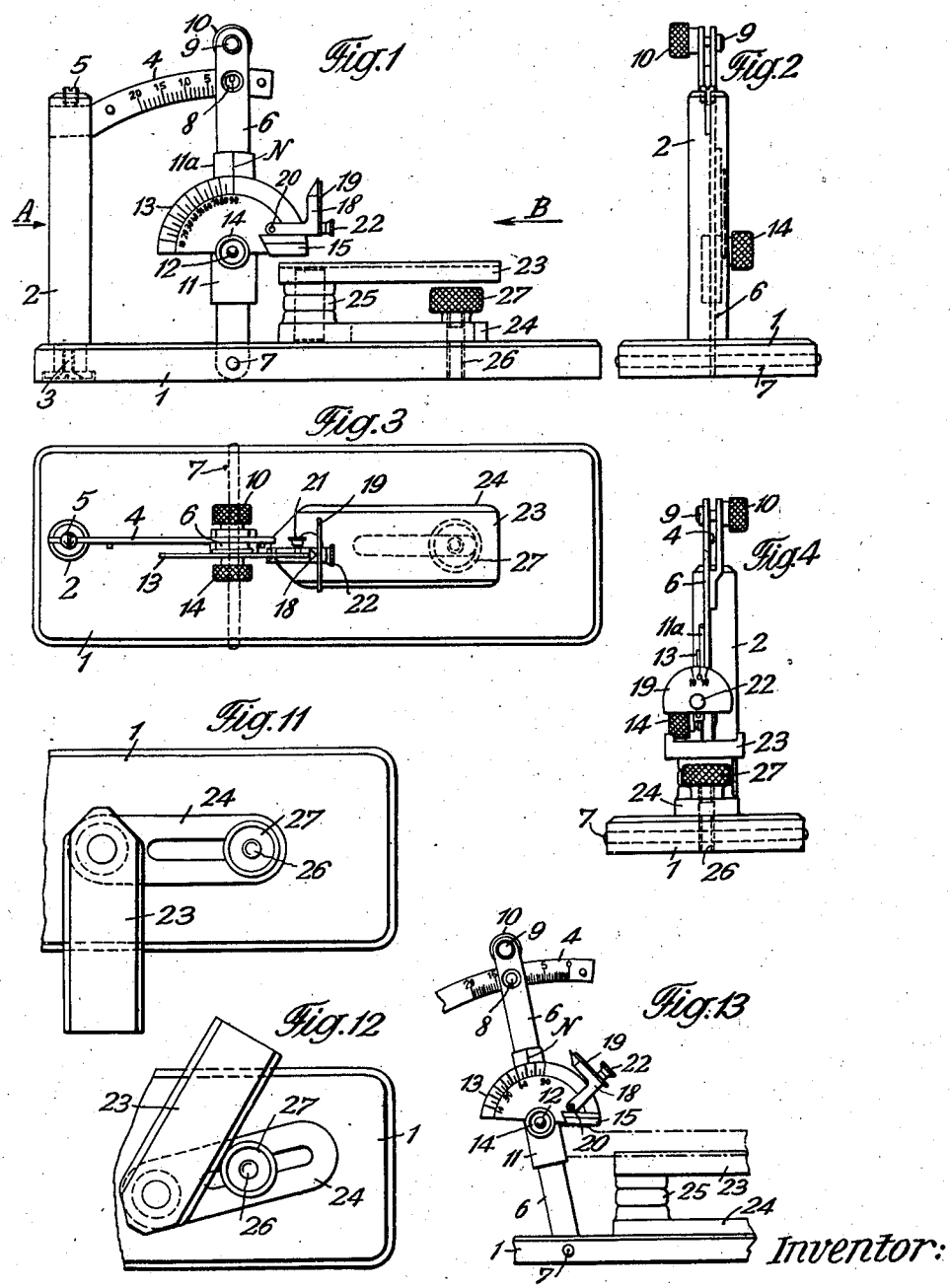

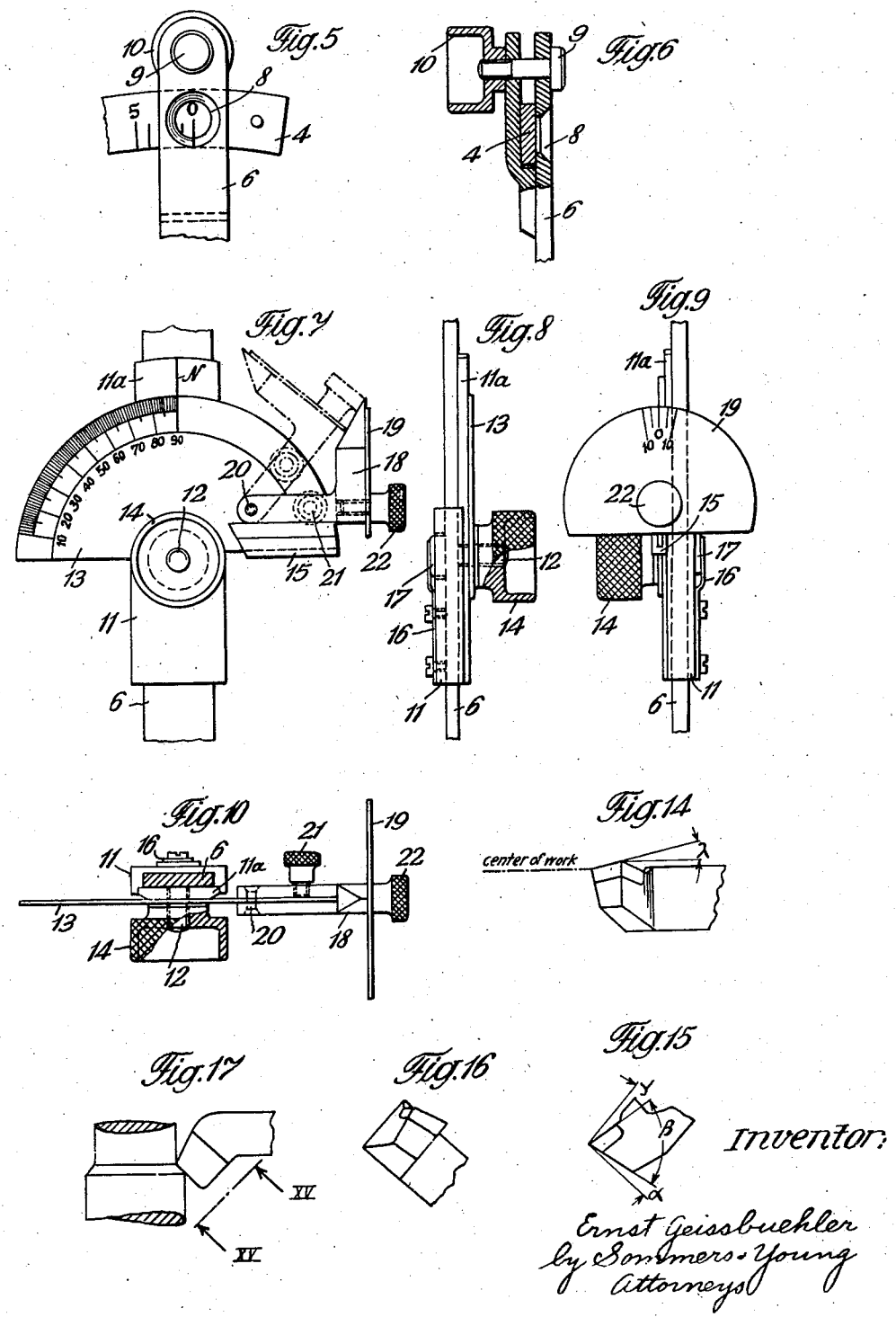

2,400,498

UNITED STATES PATENT OFFICE 2,400,498

ANGLE-MEASURING APPARATUS

Ernst Geissbuehler, Horgen, Switzerland, assignor to T. Oertli Aktiengesellschaft, Zurich, Switzerland Application December 6, 1943, Serial No. 513,100
In Switzerland July 22, 1942

3 Claims. (Cl. 33—201)

This invention relates to angle-measuring apparatus for exactly determining the cutting angles on turning and planing tools.

The measuring of the cutting angles on turning and planing tools has been effected until now mostly by means of fixed abutment jigs made of sheet material. This has the great disadvantage, that for each particular angle a separate jig is required which is simply applied against the surfaces forming the angle which is to be determined, so that measuring of this angle is effected independently of any base surface such as the base of the turning or planing tool. As a result, the angle of clearance relative to the base is disregarded and the front rake also is seldom correct for the same reason. The cutting angles given to tools accordingly depends on the feeling and the experience of the tool grinder. The cutting capacity and the cutting performance of turning and planing tools, as also the quality of the surface condition and the correct dimensioning of the work pieces, however depend on the condition of the cutting edge of the tool. Expert sharp grinding is essential for the efficiency of each single tool.

According to this invention the angle-measuring apparatus comprises a fixed angle scale projecting from a pillar, and a pivotally mounted ruler adjustable along said scale and carrying a slide on which a second scale is pivotally mounted, permitting simultaneous measuring on a tool of the angle of clearance and the cutting angle with respect to a tool support forming the base of the tool, and separate measuring of the angle of inclination with respect to said tool support.

The accompanying drawings represent by way of example an embodiment of an angle-measuring apparatus according to the present invention. In the drawings, Fig. 1 shows a side view of the apparatus, Fig. 2 is an end view in the direction of the arrow A of Fig. 1, Fig. 3 shows a plan view, Fig. 4 is an end view in the direction of the arrow B of Fig. 1, Fig. 5 is a detail view showing the upper end of the ruler movable along the fixed angle scale.

Fig. 6 is a sectional view of the detail shown in Fig. 5.

Fig. 7 is a front view of the slide carrying the pivoting scale and a tilting segment for measuring the angle of inclination, Fig. 8 is a side view of the slide without the tilting segment, Fig. 9 is a view with the tilting segment, Fig. 10 is a plan view of the arrangement shown in Fig. 7, Fig. 11 is a plan view of the laterally pivoted tool support, Fig. 12 is a plan view of the tool support pivoted to a position opposed to that shown in Fig. 11, Fig. 13 is a view of the apparatus with the tool placed upon the support and with the adjustable members in position for measuring the cutting angle and the angle of clearance of the tool, Fig. 14 represents a roughing tool and indicates the angle of inclination, Fig. 15 is a diagrammatic view showing the angle of clearance, the front rake and the cutting angle of a tool, Figs. 16 and 17 are other views of the same tool.

The represented apparatus comprises a base plate 1 carrying a pillar 2 which is fixed to the plate 1 by a screw 3. The upper end of the pillar 2 is provided with a slot adapted to receive one end of a curved measuring scale 4 provided with a graduation from 0° to 20° which serves for measuring the angle of clearance. The scale 4 is fixedly maintained in the slotted end of the pillar 2 by means of a clamping screw 5. A ruler 6 is pivotally mounted on the base plate 1, the pivot 7 being disposed on a perpendicular line going through the zero mark of the graduation of the scale 4. The upper end of the ruler 6 forms a fork which is traversed by the scale 4 (Figs. 5 and 6). The graduation can be observed through an opening 8 on the front side of the ruler 6. A clamping screw 9 with a milled nut 10 permits displacing and fixing the ruler 6 along the scale 4 to any desired position (Fig. 13). The ruler 6 carries a slide 11, which is provided on its upper end portion 11a with a zero line N (Fig. 7). The slide 11 carries a bolt 12 on which the scale segment 13 having a graduation from 90°–10° for measuring the cutting angle is pivotally mounted. The scale 13 can be angularly adjusted and clamped to any position by means of the milled nut 14. The segment 13 is provided at one end of its base edge with a reinforcement 15 serving as measuring surface which is directed radially relatively to the pivoting axis 12 of the segment. The slide 11 is maintained on the ruler 6 in its adjusted position by means of a pressure spring 16 which acts upon a friction body 17 (Fig. 8).

The segment 13 carries a tilting arm 18 on which is mounted a measuring segment 19 (Figs. 7, 9, 10) for measuring the positive angle of inclination. This tilting arm 18 is mounted on a pivot pin 20 carried by the segment 13 and is provided with a clamping screw 21, by means of which the arm 18 can be clamped in any position of its tilting stroke to the segment 13. The segment 19 is provided with a graduation from —10° to +10° and can pivot about the axis of the clamping screw 22 for the purpose of measuring the angle of inclination of the tool.

As support for the turning or planing tool when measuring the angles, there serves a tool support composed of several parts capable of being displaced relatively to the base plate 1. A bolt 26 provided with a clamping nut 27 is screwed into the base plate 1 and penetrates through a slotted supporting plate 24 carrying a pivot pin 25 on which a tool supporting arm 23 can be swung to any desired position, so as to present the cutting end of the tool, the angles of which are to be determined in the correct position to the measuring elements 6 or 13. In Fig. 11 the tool supporting arm is drawn as being pivoted towards the left, in Fig. 12 as being pivoted towards the right.

According to Fig. 13 a tool drawn in dash and dot lines is placed on the mentioned supporting arm 23; this figure illustrates how the angle of clearance and the cutting angle are measured.

Figs. 14 to 17 show a roughing tool in different views, and represent the various angles which can be determined by the described apparatus. These angles are the following:

Angle $\alpha$ = angle of clearance
Angle $\beta$ = cutting angle
Angle $\gamma$ = front rake
Angle $\lambda$ = positive angle of inclination.

For effecting the various measurements the tool shank is placed upon the tool support, as indicated, for example, in Fig. 13, with the surfaces forming the angles to be measured pressed against the surfaces for performing the measurement, and the tool is moved forwardly or backwardly until the respective surfaces are in complete engagement. Thus in Fig. 13 the angle of the ruler 6 takes the angle of clearance which is indicated on the scale 4, and the surface 15 takes the angle of forward rake, and the angle between the ruler 6 and the pivoted member 13 then indicates the cutting angle. In a similar way the other angles are measured by appropriately contacting same with the respective surfaces.

I claim:

1. Angle measuring apparatus for determining the cutting angles of turning and planing tools, comprising a base plate, a pillar mounted on said plate, a fixed angle scale projecting from said pillar, a ruler having one end pivotally mounted on said base plate and the other end adjustable along said fixed angle scale to indicate the angle of clearance of a tool to be examined, a slide movable along said ruler, a movable angle scale pivotally mounted on said slide and adapted to indicate relative to the ruler the cutting angle of the tool to be examined, and tool supporting means mounted on said base plate.

2. Angle measuring apparatus as defined in claim 1 wherein a spring is provided to maintain said slide carrying the pivotally mounted angle scale in frictional engagement with said ruler.

3. Angle measuring apparatus as claimed in claim 1 wherein said tool supporting means is pivotally mounted on the base plate so as to be movable in a horizontal plane.

ERNST GEISSBUEHLER.